Jan. 10, 1933.  E. L. WEBER  1,894,229
HEATING AND VENTILATING DEVICE
Filed March 8, 1928  2 Sheets-Sheet 1

ERWIN L. WEBER.
INVENTOR
BY
Harry Bowen
ATTORNEY

Jan. 10, 1933.　　　　E. L. WEBER　　　　1,894,229
HEATING AND VENTILATING DEVICE
Filed March 8, 1928　　2 Sheets-Sheet 2

ERWIN L. WEBER.
INVENTOR
BY
ATTORNEY

Patented Jan. 10, 1933

1,894,229

UNITED STATES PATENT OFFICE

ERWIN L. WEBER, OF SEATTLE, WASHINGTON, ASSIGNOR TO ELSA M. OBST, OF ST. PAUL, MINNESOTA

HEATING AND VENTILATING DEVICE

Application filed March 8, 1928. Serial No. 260,142.

The invention is a method for extracting the heat or cold from exhaust or vitiated air or other gas being discharged from buildings or the like and utilizing the heat or cold thus extracted to raise or lower the temperature of incoming fresh air or other gas.

The object of the invention is to provide means for supplying an enclosure with fresh air in which the fresh air is heated or cooled by thermal units extracted from air or gas being discharged from the enclosure and imparted to the incoming air by a liquid and without re-circulating the air.

Another object of the invention is to provide means for extracting heat or cold from air being discharged from an inclosure and imparting the heat or cold to fresh air entering the inclosure.

A further object of the invention is to provide means for extracting heat or cold from air being discharged from a building by a liquid, conveying the liquid to the path of the incoming fresh air and transmitting the heat or cold from the liquid to the incoming fresh air.

A still further object of the invention is to provide means for extracting heat or cold from air being discharged from an inclosure and imparting the heat or cold to air entering the inclosure in which the said transmitting apparatus is arranged in a plurality of stages through which the outgoing and incoming air passes.

And a still further object of the invention is to provide a suitable apparatus for efficiently removing heat or cold from air or gas being discharged from the inclosure and imparting it to air or gas entering the inclosure which is of a comparatively simple and economical construction.

With these ends in view the invention embodies an air washer or other apparatus which permits air passing therethrough to pass through an atomized spray, which may be located in the path of air being discharged from an inclosure, a similar apparatus through which air entering the inclosure must pass, and suitable means for conveying the liquid of the spray through which the outgoing air passes to the spraying apparatus through which the incoming air passes and for conveying the liquid from the spray through which the incoming air passes to the spray through which the outgoing air passes.

Other features and advantages of the invention will appear from the following description, taken in connection with the drawings, wherein.

Figure 1:
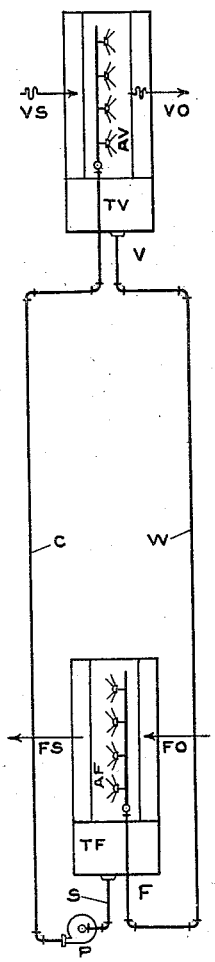
Figure 1 is a diagrammatic view showing an outline of the apparatus in which a single stage is shown.
Figure 2:
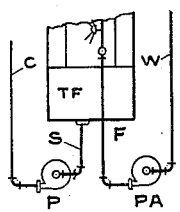
Figure 2 is a detail showing an alternate design in which a circulating pump is shown in the incoming spray supply line which may be used if desired.

In the drawings the device is shown as it would be made wherein F indicates an air washer or other liquid atomizing device, through which the incoming air will pass as indicated by the arrows FS and FO and V indicates a similar air washer through which the outgoing air will pass as indicated by the arrows VS and VO. At the lower ends of the washers F and V are tanks TF and TV in which the water, brine or other liquid from the spray is collected and in the bottom of these tanks are pipes for conveying the liquid to the spraying devices of the opposite washer. The pipe S is connected to the bottom of the tank TF and also to a pump P and the discharge of the pump P is connected to the spraying devices AV in the washer V by a pipe C. The tank TV is connected by a pipe W to the spraying devices AF in the washer F. This pipe may be provided with a pump PA as shown in Figure 2 to circulate the liquid if desired. This diagram as shown in Figure 1 discloses a complete apparatus in which the spraying devices AV will extract the heat or cold from a fluid passing therethrough and the liquid of the spraying devices will pass into the tank TV and from there through the pipe W to the spraying devices AF through which the incoming gas passes. The vitiated gases may therefore be exhausted with the heat or cold extracted and the heat or cold may therefore be transmitted to the incoming air or gases without re-circulating the air or gas.

Figure 3:
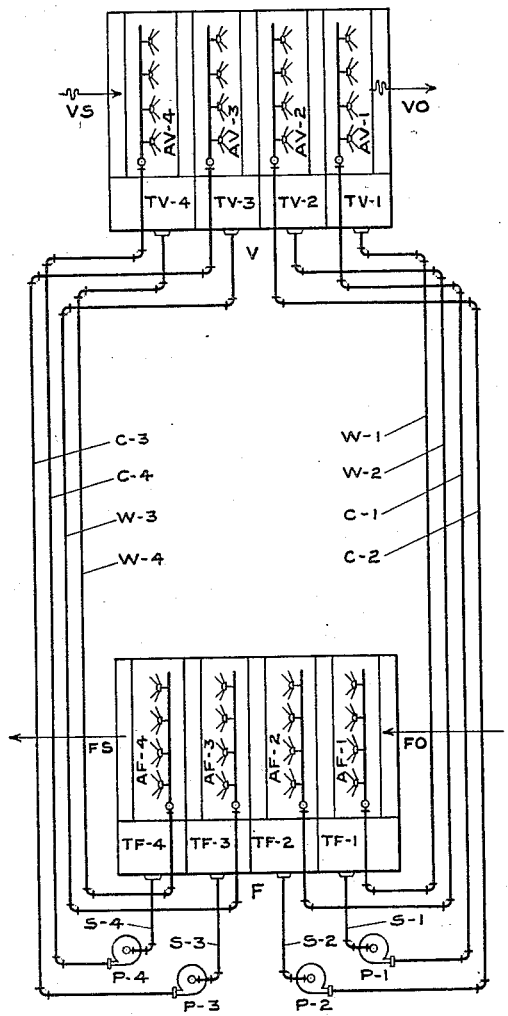
Figure 3 is a diagrammatic view showing an apparatus similar to that shown in Figure 1 in which a plurality of stages is used.

In the design shown in Figure 3 a plurality of washers is shown in each instance and the washers or atomizers in the path of the outgoing air or gas are indicated by the numerals AV—1, AV—2, AV—3 and AV—4 and the washers or atomizers in the path of the incoming air or gas are indicated by the numerals AF—1, AF—2, AF—3 and AF—4. In this design the first stage of the device in the path of the vitiated or outgoing gases in which is the washer AV—4, is connected to the last stage of the device in the path of the incoming gases which is indicated by AF—4 as the first stage of the device in the path of the outgoing gases will absorb the heat at the higher range of temperature and will therefore have a higher temperature and therefore the last stage of the washer in the path of the incoming gases will have the higher temperature so that as the incoming gases reach the first stage which will have the lower temperature and then pass from one stage to another the temperature will be gradually raised until it reaches the last stage which will have the highest temperature. It will be understood that although the device shown in Figure 3 is provided with four stages having an equal number in each apparatus, any suitable number of stages may be used or different numbers of stages may be used in the paths of the incoming and outgoing gases. It is also understood that although pumps are only shown in one of the pipes connecting the two sections of apparatus, they may also be used in the other pipes.

Figure 4:
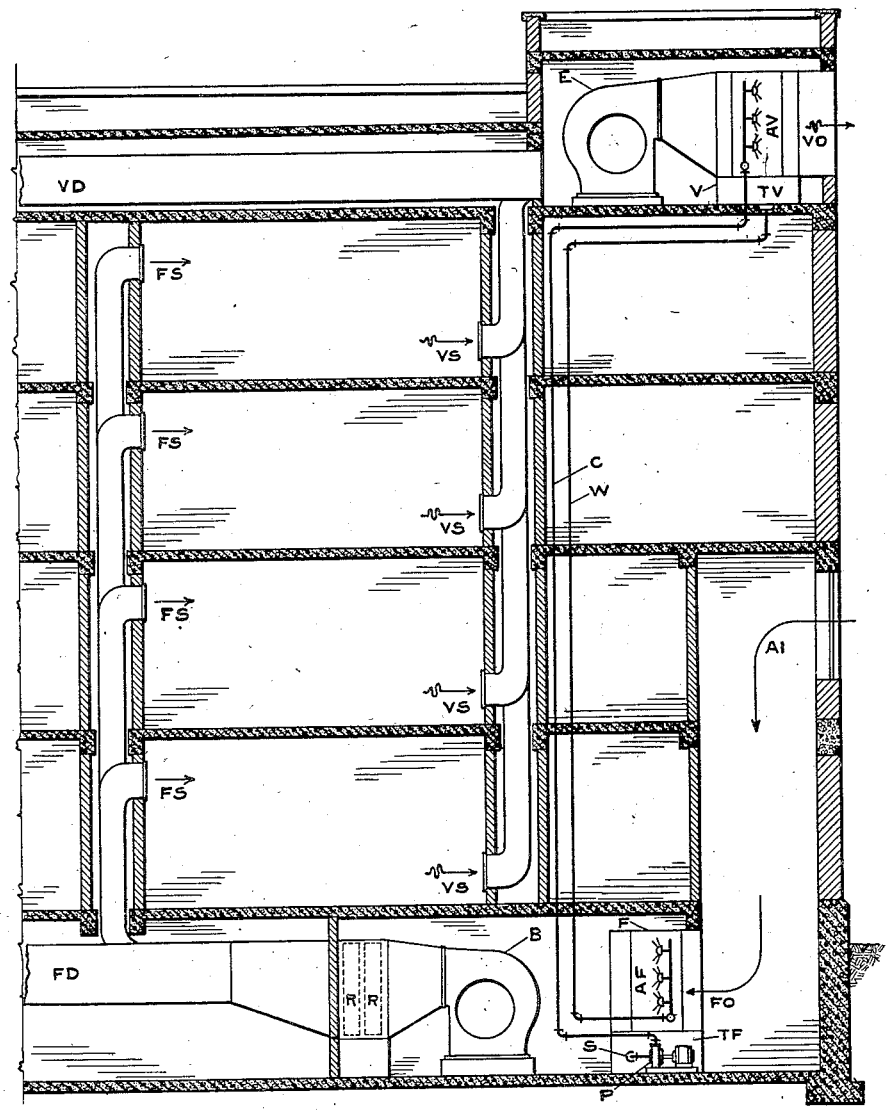
Figure 4 is a view showing the application of the device to a plurality of rooms in a building.

In the design shown in Figure 4 the device is shown as it would be positioned in a building in which the rooms are provided with inlets FS and outlets VS, the outlets connecting to a vertical duct which opens into a duct VD that passes to a room around an exhaust fan E and the discharge of the fan is connected by a housing to the outside of the building so that the vitiated air or gases from the building may be discharged as indicated by the arrow VO. In this design the washer V is located in the housing and the spraying devices AV are positioned so that the vitiated air or gases must pass through the spray. The liquid of the spray is collected in the tank TV which passes downward through the pipe W to the spraying devices AF in the washer F which is preferably positioned in a lower floor. The washer F is connected through an opening to the outside of the building as indicated by the arrows AI and FO. The liquid from the washer F is collected in a tank TF and forced upward to the spraying devices AV by a pump P through pipes S and C. The incoming air passes through the washer F, enters the room around the blower B and is discharged from the blower into a duct FD which connects to vertical ducts in which the openings FS are provided, which discharge the air into the rooms The duct FD may be provided with auxiliary heaters R which may be used if desired to further raise the temperature of the incoming air. These heaters may be of any suitable type or design and arranged in any suitable manner and it is also understood that any other suitable means may be used for raising the temperature of the incoming air. It will be observed that by utilizing the heat from the air being discharged to raise the temperature of the incoming air it will only be necessary to add a comparatively small amount of additional heat to the incoming air.

It will be understood that changes may be made in the construction without departing from the spirit of the invention. One of which changes may be in the use of any other suitable means for imparting the heat or cold from the fluid being discharged to a liquid and from the liquid to the incoming air, another may be in the use of other means for conveying the liquid from one section of the apparatus to the other, another may be in the use of any other suitable means for circulating the air or other gases, and still another may be in the use of the devices for any other purpose.

The construction will be readily understood from the foregoing description. To use the device it may be installed in a building as shown in Figure 4 or installed in any other type of inclosure with one section of the apparatus in the path of the discharge from the inclosure and the other in the path of the intake, and as the device is operated the heat or cold will be removed from the fluid being discharged and imparted to the fluid entering the inclosure.

This device has been described as being preferably applied in extracting heat from gases being discharged and imparting the said heat to incoming gases, however it is understood that it may also be used to extract cold from gases being discharged and the cold may be imparted to gases entering the device so that a building or inclosure may be cooled as well as heated. It is also understood that the device may be used for any other suitable purpose.

Having thus fully described the invention, what I claim as new and desire to secure by Letters Patent, is:

An improved method of heating and ventilating an enclosure which comprises passing the incoming air thru a battery of stages in each of which it is subjected to a liquid spray, passing the outgoing air thru a similar battery of similar stages, conducting liquid from the spray of the last stage of one battery to the spray of the first stage of the other battery, from the spray of the next to the last stage of one battery to the spray of the second stage of the other battery, from the spray of the third from the last stage of one battery to the spray of the third stage of the other battery, and from the spray of the first stage of one battery to the spray of the last stage of the other battery.

ERWIN L. WEBER.